United States Patent
Jha

(10) Patent No.: US 9,946,754 B2
(45) Date of Patent: *Apr. 17, 2018

(54) SYSTEM AND METHOD FOR DATA VALIDATION

(71) Applicant: Wipro Limited, Bangalore (IN)

(72) Inventor: Dharmendra Jha, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,977

(22) Filed: Jul. 8, 2016

(65) Prior Publication Data

US 2016/0321324 A1 Nov. 3, 2016

Related U.S. Application Data

(63) Continuation of application No. 14/260,033, filed on Apr. 23, 2014, now Pat. No. 9,424,290.

(30) Foreign Application Priority Data

Mar. 11, 2014 (IN) .......................... 1267/CHE/2014

(51) Int. Cl.
*G06F 17/30* (2006.01)

(52) U.S. Cl.
CPC .. *G06F 17/30507* (2013.01); *G06F 17/30144* (2013.01); *G06F 17/30309* (2013.01); *G06F 17/30371* (2013.01); *G06F 17/30864* (2013.01); *G06F 17/30563* (2013.01)

(58) Field of Classification Search
CPC ................................................. G06F 17/30563
See application file for complete search history.

(56) References Cited

U.S. PATENT DOCUMENTS

| | | | |
|---|---|---|---|
| 9,720,971 B2 * | 8/2017 | Bittner | .............. G06F 17/30507 |
| 2006/0218123 A1 | 9/2006 | Chowdhuri | |
| 2008/0091720 A1 | 4/2008 | Klumpp | |
| 2008/0109475 A1 * | 5/2008 | Burmester | .......... G06F 17/2785 |
| 2012/0150820 A1 | 6/2012 | Sankaranarayanan | |
| 2012/0265727 A1 | 10/2012 | Naryzhnyy | |
| 2012/0290527 A1 | 11/2012 | Yalamanchilli | |
| 2014/0032527 A1 | 1/2014 | Chambers | |
| 2014/0310231 A1 | 10/2014 | Sampathkumaran | |

* cited by examiner

*Primary Examiner* — Hung Q Pham
(74) *Attorney, Agent, or Firm* — LeClairRyan PLLC

(57) ABSTRACT

Systems and methods for validating data in a communication network environment include receiving a data transformation specification from a user. The data transformation specification is analyzed to determine data transformation rules which are indicative of a relationship between corresponding fields of the source repository and the target repository. Test cases and test scripts are generated based on the data transformation rules and the test cases and the test scripts are executed on the source repository and the target repository to validate the relationship between the corresponding fields of the source repository and the target repository. Thereafter, a log file, indicative of the outcome of the execution of the test cases and the test scripts, is generated.

15 Claims, 4 Drawing Sheets

SYSTEM AND METHOD FOR DATA VALIDATION

This is a continuation of U.S. patent application Ser. No. 14/260,033, filed Apr. 23, 2014 which claims the benefit of Indian Patent Application No. 1267/CHE/2014 filed Mar. 11, 2014, which is hereby incorporated by reference in its entirety.

FIELD

The present subject matter is related, in general to data validation and, in particular, but not exclusively to a method and system for validating data in a communication network environment.

BACKGROUND

In recent time, most of the organizations use various systems and methods to manage their day to day working. Examples of such software tools may include enterprise resource planning (ERP) systems, customer relationship management (CRM) systems, and supply chain management (SCM) systems. Each of these software tools is associated with various data repositories and has its own respective data model. Examples of data stored in the data repositories include customer data, transaction data, business research data, and so on.

It is well known, by those skilled in the art, that each of the software tools may use, retrieve and store the data in different formats. Further, in an organization, the various software tools, configured to manage the day to day working of the organization, are often interlinked. This makes it important that the data used and stored by each of these software tools are accurate, updated and consistent.

However, with time, various changes take place in the organization which may involve installation of new applications, re-platforming of applications, migration of data repositories from one vendor to a different vendor and so on. In many situations, this involves migrating the data from an existing data repository to a new data repository.

During this migration, many errors, such as system field limitations, mergers and migrations, data repository migrations, inconsistent standards, discrepancies in data format, difference in structure of data repositories, missing data, data fields filled with default values or nulls, spelling errors and data anomalies, may creep in and degrade the quality of data. This adversely affects the functioning of the new application or re-platformed application or the new data repository. Erroneous data transformation may adversely impact the functioning of the organization. For example the organization having erroneous data transformation processes may suffer from losses arising from extra costs to prepare reconciliations, delay or scrapping migration to a new application or new data repository, failure to bill or collect receivables, inability to deliver orders, failure to meet contracts and so on. The erroneous data can also lead to incompetent future decisions of enterprise and has the potential to negatively impact the growth of the enterprise.

SUMMARY

Disclosed herein are systems and methods for validating data in a communication network environment. In one example, the system for validating data, in a communication network environment, comprises a processor, a memory communicatively coupled to the processor. The system further comprises a processor and a memory communicatively coupled to the processor, wherein the memory stores processor-executable instructions, which, on execution, cause the processor to receive a data transformation specification from a user; analyze the data transformation specification to determine data transformation rules, wherein the data transformation rules are indicative of a relationship between corresponding fields of the source repository and the target repository; generate test cases and test scripts based on the data transformation rules; execute the test cases and the test scripts on the source repository and the target repository to validate the relationship between the corresponding fields of the source repository and the target repository; and generate a log file indicative of the outcome of the execution of the test cases and the test scripts.

In an aspect of the invention, the method, for validating data in a communication network environment, comprises a data transformation specification from a user and analyzing the data transformation specification to determine data transformation rules, wherein the data transformation rules are indicative of a relationship between corresponding fields of the source repository and the target repository. The method further comprises generating test cases and test scripts based on the data transformation rules and executing the test cases and the test scripts on the source repository and the target repository to validate the relationship between the corresponding fields of the source repository and the target repository. Thereafter, a log file, indicative of the outcome of the execution of the test cases and the test scripts, is generated It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
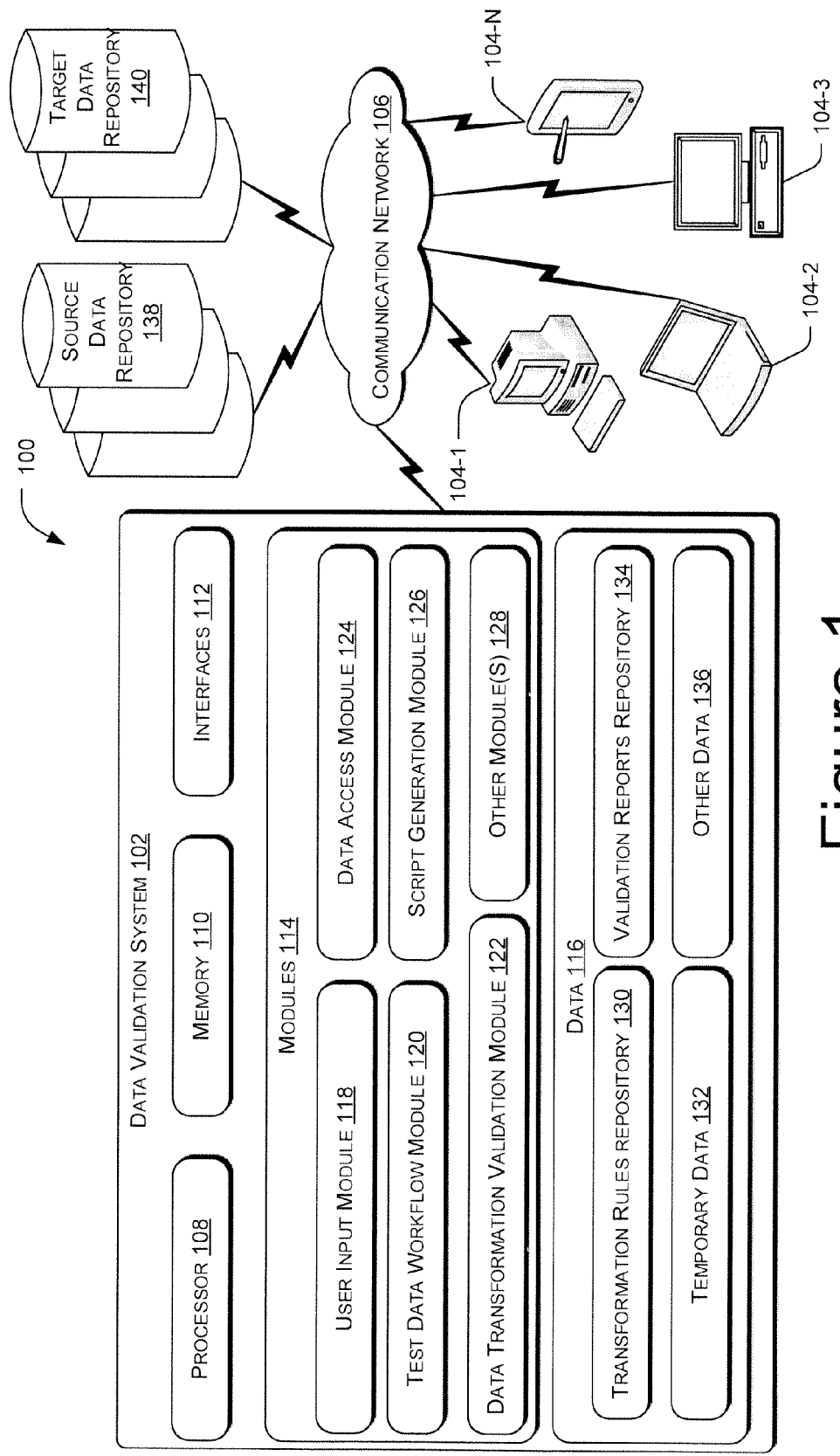
FIG. 1 is a block diagram of a network environment implementing a data validation system for validating data in a communication network environment, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for validating data in a communication network environment are described herein. The systems and methods may be implemented in a variety of computing systems. The computing systems that can implement the described method(s) include, but are not limited to a server, a desktop personal computer, a notebook or a portable computer, a mainframe computer, and in a mobile computing environment. Although the description herein is with reference to certain computing systems, the systems and methods may be implemented in other computing systems, albeit with a few variations, as will be understood by a person skilled in the art.

In recent time, most of the organizations use various systems and methods to manage their day to day working. Examples of such software tools may include enterprise resource planning (ERP) systems, customer relationship management (CRM) systems, and supply chain management (SCM) systems. Each of these software tools is associated with various data repositories and has its own respective data model. Examples of data stored in the data repositories include customer data, transaction data, business research data, and so on.

It is well known, by those skilled in the art, that each of the software tools may use, retrieve and store the data in different formats. With time, the organization may decide to update the installed applications or replace the installed applications with different applications or replace the data repositories or even re-platform the installed applications. In many situations, the new/updated applications or data repositories may have different data formats, data types and so on. Hence, while transforming the data from a source data repository to a target data repository various data transformation rules are determined which state the relationship between corresponding tables/fields of the source data repository and the target data repository. The data transformation operation converts a set of data values from the data format of the source data repository into the data format of the destination data repository. The data transformation operation is usually carried out in two steps. In the first step, the corresponding fields and tables of the source data repository and the destination data repository are mapped. Thereafter, a code snippet is generated which on execution causes the actual data transformation. In most conventional systems, the data transformation rules are then tested manually to ensure that the data transformation has been performed without any errors. However, the conventional techniques for verifying data transformation involve a substantial amount of manual actions or manual interventions. Further, in many cases mapping the data transformation may be from multiple data sources, for example, multiple databases stored in the source data repository. In such situations, preserving data integration and synchronization functionality becomes very challenging. Hence, various errors, such as data entry errors, limited validation of data at the time of entry, system field limitations, mergers and migrations, data repository migrations, inconsistent standards, discrepancies in data format, difference in structure of data repositories, missing data, data fields filled with default values or nulls, spelling errors and data anomalies may creep in which may adversely affect the functioning of the new/updated applications or data repositories.

The present subject matter discloses systems and methods for validating data in a communication network environment. In one implementation, a data validation system, also referred to herein as a data validation apparatus, validates the data transformation processes when transferring data from a source data repository to a target data repository. The source data repository and the target data repository may be implemented using any conventional database systems such as Sybase™, MySQL™, DB2™, SQL Server™, Oracle™. It should be appreciated by those skilled in the art that though the systems and methods for validating data in a communication network environment are described in the context of validating data transformations when migrating from the source data repository to the target data repository, the same should not be construed as a limitation. For example, the systems and methods for validating data in a communication network environment may be implemented for various other purposes, such for determining data consistency, and determining compatibility of data repository with applications.

In one example, the data validation system prompts the user to input a data transformation specification. In one example, the data transformation specification may include the schema of the source data repository and the target data repository and also include the rules, in human readable language, based on which the data transformation is to be done. On receiving the data transformation specification, the data validation system parses the same and processes the parsed data transformation specification to generate data transformation rules. The data transformation rules may comprise assign rules which assign a default value to particular fields, pattern-Replace rules in which patterns, in the values of the fields, are replaced, replace rules in which the values of the fields are replaced, and truncate rules in which if the length of the value of the field exceeds a pre-defined length, then the rule truncates the value to the pre-defined length.

Thereafter, the data validation system generates the test cases and test scripts to validate the data transformation rules. In one example, the data validation system may be communicatively coupled to any third party testing tool to generate the test cases and test scripts. In yet another example, the user may feed the test cases and test scripts to the data validation system.

On receiving the test cases and the test scripts, the data validation system determines whether the number of data records to be processed, i.e. validated, is more than a critical threshold. If the number of data records to be processed exceeds a critical threshold, then the data validation system initiates a parallel execution of the test cases. If the number of data records to be processed is less than a critical threshold, then the data validation system initiates a serial execution of the test cases. In one example, the data validation system may execute the test cases and test scripts based on the associated data transformation rule. For example, the data validation system may execute test cases associated with data transformation rule 'N' before executing test cases associated with data transformation rule 'M'. This may facilitate the data validation system to exit the validation process on determining the data transformation rule 'N' to have been violated and thus, save processing power and memory resources by not executing data transformation rule 'M'. In one example, the data validation system may determine the sequence of execution of test cases and test scripts based on the optimized use of processing power and memory.

On completion of the execution of the test cases and test scripts, the data validation generates a log file. The log file indicates the result of the test cases and mentioned the data transformation rules that have been validated and the data transformation rules that have been violated. In one example, the log file may mention the primary key or the record number of the records which have violated the data transformation rules. Thus, the data validation system implements a fast data validation process which eliminates manual intervention and hence, eliminates errors caused due to manual processing. The data validation system also eliminates the errors caused due to difference in understanding, of different testing professionals, of the data transformation specification.

The working of the systems and methods for validating data in a communication network environment is described in greater detail in conjunction with FIG. 1-4. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 implementing a data validation system 102 for validating data in a communication network environment, according to some embodiments of the present subject matter. In one implementation, the data validation system 102 may be included within an existing information technology infrastructure of an organization. For example, the data validation system 102 may be interfaced with the existing content and document management system(s), database and file management system(s), of the organization.

The data validation system 102 may be implemented in a variety of computing systems, such as a laptop computer, a desktop computer, a notebook, a workstation, a mainframe computer, a server, a network server, and the like. It will be understood that the data validation system 102 may be accessed by users through one or more client devices 104-1, 104-2, 104-3, 104-N, collectively referred to as client devices 104. Examples of the client devices 104 include, but are not limited to, a desktop computer, a portable computer, a mobile phone, a handheld device, a workstation. The client devices 104 may be used by various stakeholders or end users of the organization, such as project managers, database administrators and application developers. As shown in the figure, such client devices 104 are communicatively coupled to the data validation system 102 through a network 106 for facilitating one or more end users to access and/or operate the data validation system 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the data validation system 102 includes a processor 108, a memory 110 coupled to the processor 108 and interfaces 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the data validation system 102 to interact with the client devices 104. Further, the interface(s) 112 may enable the data validation system 102 respectively to communicate with other computing devices, The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the data validation system 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract data types. The modules 114 and may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 further include a user input module 118, a test data workflow module 120, a data transformation validation module 122, a data access module 124, a script generation module 126, and other modules 128. The other modules 128 may perform various miscellaneous functionalities of the data validation system 102. It will be appreciated that such aforementioned modules may be represented as a single module or a combination of different modules.

In one example, the data 116 serves, amongst other things, as a repository for storing data fetched, processed, received and generated by one or more of the modules 114. In one implementation, the data 116 may include, for example, transformation rules repository 130, temporary data 132, validation reports repository 134, and other data 136. In one embodiment, the data 116 may be stored in the memory 110 in the form of various data structures. Additionally, the aforementioned data can be organized using data models, such as relational or hierarchical data models. The other data 136 may be used to store data, including temporary data and temporary files, generated by the modules 114 for performing the various functions of the data validation system 102.

In one implementation, the data validation system 102 is communicatively coupled with a source data repository 138 and a target data repository 140. The source data repository 138 and the target data repository 140 may comprise one or more commercially available data storage media, such as compact discs, magnetic tapes, SATA disks, and so on. The source data repository 138 and the target data repository 140 may also implement various commercially available database management systems, such as Oracle™ Database, and Microsoft™ SQL Server. In one example, the source data repository 138 and the target data repository 140 stores raw data which may be further accessed or processed by various applications used in the organization or its clients. In one implementation, the source data repository 138 and/or the target data repository 140 may be implemented within the data validation system 102.

In operation, the user input module 118 prompts the user to input a data transformation specification. In one example, the user input module 118 may generate various graphical user interfaces and/or command line interfaces to facilitate the user to enter the data transformation specification. In one example, the data transformation specification may the schema of the source data repository 138 and the target data repository 140. The user input module 118 may facilitate the user to view the schemas in a graphical manner, for example, in form of a tree structure, to facilitate easy creation of mappings of the corresponding fields and tables of the source data repository 130 and the target repository 140. In one example, the user input module 118 may facilitate the user to drag and drop fields from the source data repository 138 to the target data repository 140 for the purpose of creating mappings.

In one implementation, the user input module 118 further prompts the user to input the configuration parameters of the source data repository 138 and the target data repository 140. The configuration parameters may include the authentication details, such as username and password, to access the source data repository 138 and the target data repository 140, the internet protocol (IP) addresses of the source data repository 138 and the target data repository 140, the port numbers on which the source data repository 138 and the target data repository 140 are operating, the protocol to access the source data repository 138 and the target data repository 140 and so on. On receiving the configuration parameters, the data access module 124 validates the configuration parameters and ascertains whether connection with the source data repository 138 and the target data repository 140 can be established with the received configuration parameters.

In one example, the test data workflow module 120 analyzes the data transformation specification to generate data transformation rules. In one example, the test data workflow module 120 parses the data transformation specification to determine the data transformation rules. The data transformation rules are indicative of the relationship between the values of the corresponding fields of the source data repository 138 and the target data repository 140. The data transformation rules may modify the values or the patterns in values while transforming from the source data repository 138 to the target data repository 140. The data transformation rules may be clubbed with conditional rules so as to modify the values or patterns only in fields of the source data repository 138 that meet the pre-defined criteria. In one example, the test data workflow module 120 may store the data transform rules as transformation rules repository 130.

Thereafter, the test data workflow module 120 generates test cases for validating the data transformation rules. In one implementation, the test data workflow module 120 may be communicatively coupled with any commercially available testing tool for the purpose of creation of test cases. In one example, the test data workflow module 120 also facilitates the user to select the test cases for testing the data transformation rules. Thereafter, the script generation module 126 generates test scripts for executing the test cases.

In one example, the script generation module 126 may generate the test scripts in a way so as to execute the test cases based on the associated data transformation rule. For example, the script generation module 126 may execute test cases associated with data transformation rule 'N' before executing test cases associated with data transformation rule 'M'. On completion of the generation of test scripts, the data transformation validation module 122 executes the test scripts. The order in which the test cases are to be executed facilitates the data transformation validation module 122 to exit the validation process on determining the data transformation rule 'N' to have been violated and thus, save processing power and memory resources by not executing data transformation rule 'M'. In one example, the data transformation validation module 122 may determine the sequence of execution of test cases and test scripts based on the optimized use of processing power and memory.

On completion of the execution of the test cases and test scripts, the data transformation validation module 122 generates a log file. The log file indicates the result of the test cases and mentioned the data transformation rules that have been validated and the data transformation rules that have been violated. In one example, the log file may mention the primary key or the record number of the records which have violated the data transformation rules.

In one example, the data transformation validation module 122 may generate various reports from the log files which may be used by the users, such as developers and/or database administrators, to analyze any issues that may have taken place during the data transformation process. For example, the reports may include various statistical data on the data validation process in tabular format or in the form of charts that may provide the user with an overview of the results of the data validation process.

Thus, the data validation system 102 implements a fast data validation process which eliminates manual intervention and hence, eliminates errors caused due to manual processing. The data validation system 102 also eliminates the errors caused due to difference in understanding, of different testing professionals, of the data transformation specification. The detailed working of the data validation system 102 is further explained in conjunction with the FIGS. 2-4.

Figure 2:
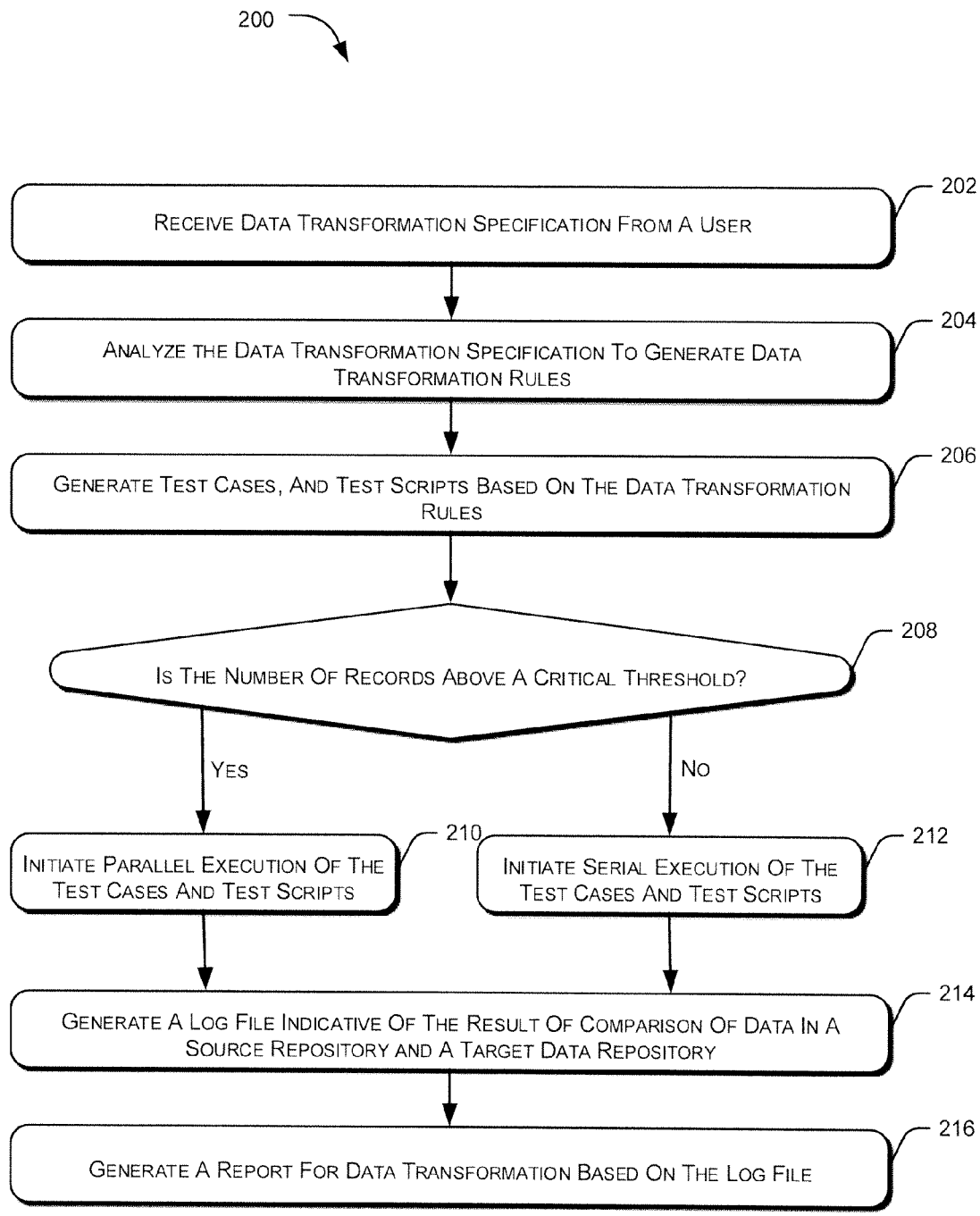
FIGS. 2 and 3 are flow charts of methods for validating data in a communication network environment, according to an embodiment of the present subject matter.
Figure 3:
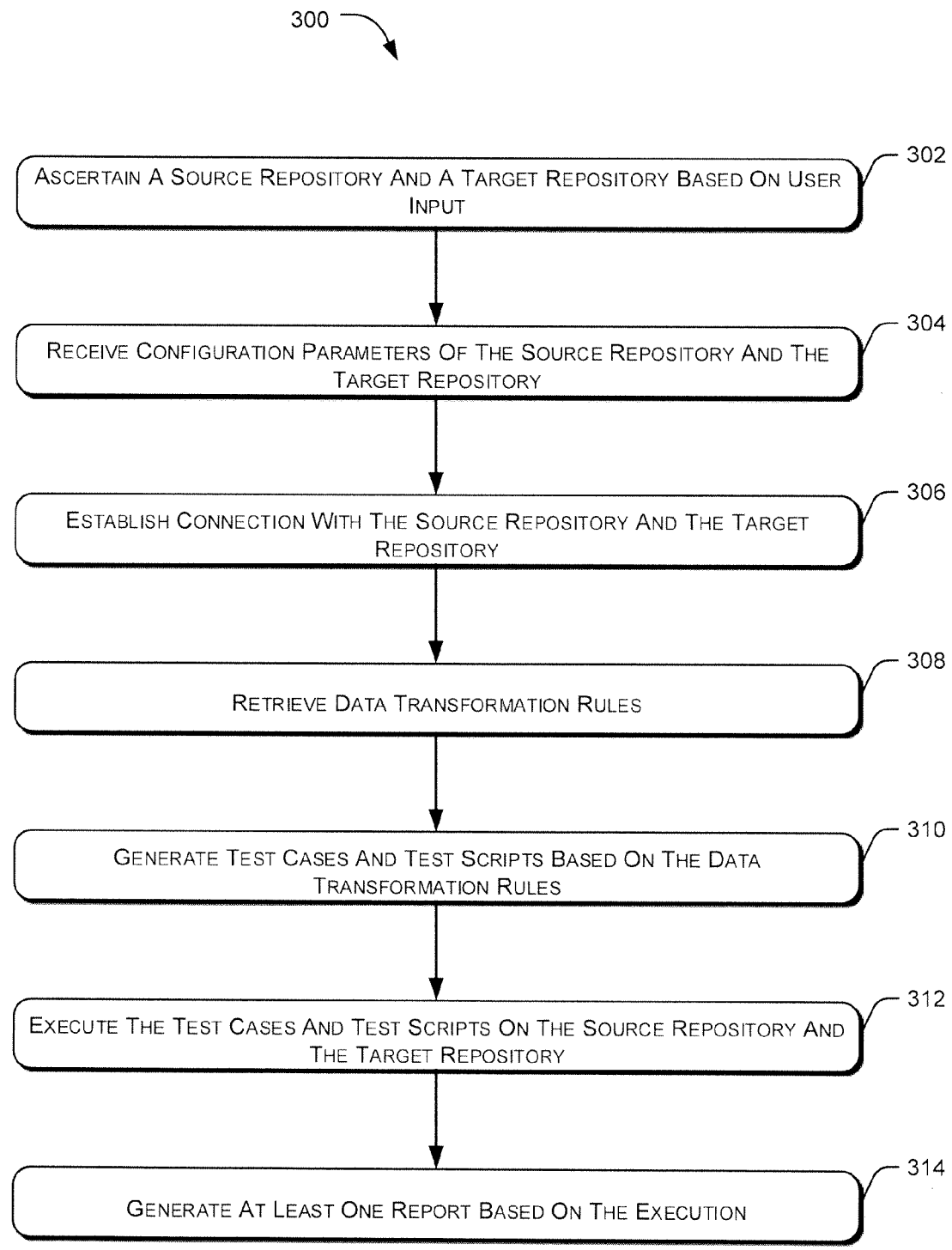

FIGS. 2 and 3 exemplary computer implemented methods for validating data in a communication network environment, according to an embodiment of the present subject matter. The methods 200 and 300 may be described in the general context of computer executable instructions. Generally, computer executable instructions can include routines, programs, objects, components, data structures, procedures, modules, and functions, which perform particular functions or implement particular abstract data types. The methods 200 and 300 may also be practiced in a distributed computing environment where functions are performed by remote processing devices that are linked through a communication network. In a distributed computing environment, computer executable instructions may be located in both local and remote computer storage media, including memory storage devices.

The order in which the methods 200, and 300 is described is not intended to be construed as a limitation, and any number of the described method blocks can be combined in any order to implement the methods 200, and 300 or alternative methods. Additionally, individual blocks may be deleted from the methods 200 and 300 without departing from the spirit and scope of the subject matter described herein. Furthermore, the methods 200, and 300 can be implemented in any suitable hardware, software, firmware, or combination thereof.

With reference to method 200 as depicted in FIG. 2, as shown in block 202, a data transformation specification is received from a user. In one example, the user input module 118 may generate various graphical user interfaces and/or command line interfaces to facilitate the user to enter the data transformation specification.

As illustrated in block 204, the data transformation specification is analyzed to generate data transformation rules. In one example, the test data workflow module 120 parses the data transformation specification to determine the data transformation rules.

As depicted in block 206, test cases, and test scripts are generated based on the data transformation rules. In one example, the test data workflow module 120 generates test cases and test scripts based on the data transformation rules.

At block 208, it is determined whether the number of records is above a critical threshold. In one example, the data transformation validation module 122 determines whether the number of records is above a critical threshold.

If at block 208, the number of records is determined to be above the critical threshold, then, as shown in block 210, parallel execution of the test cases and test scripts is initiated. In one example, the data transformation validation module 122 initiates parallel execution of the test cases and test scripts on determining the number of records to be above the critical threshold.

If at block 208, the number of records is determined to be below the critical threshold, then, as shown in block 212, serial execution of the test cases and test scripts is initiated. In one example, the data transformation validation module 122 initiates serial execution of the test cases and test scripts on determining the number of records to be below the critical threshold.

As shown in block 214, a log file is generated, wherein the log file is indicative of the result of comparison of data in a source repository and a target data repository. In one example, the data transformation validation module 122 generates a log file. The log file indicates the result of the test cases and mentioned the data transformation rules that have been validated and the data transformation rules that have been violated.

As illustrated in block 216, a report is generated for data transformation based on the log file. In one example, the data transformation validation module 122 may generate various reports from the log files which may be used by the users, such as developers and/or database administrators, to analyze any issues that may have taken place during the data transformation process.

With reference to method 300 as depicted in FIG. 3, as shown in block 302, a source repository and a target repository is ascertained based on user input. In one example, the user input module 118 prompts the user to enter the identifiers for the source repository and the target repository. The identifiers may be server-name, IP address of the source repository and the target repository, and so on.

At block 304, configuration parameters of the source repository and the target repository are received. In one example the user input module 118 may generate various graphical user interfaces and/or command line interfaces to facilitate the user to enter the configuration parameters of the source repository and the target repository.

As illustrated in block 306, connections are established with the source repository and the target repository. In one example, the data access module 124 establishes the connections are established with the source repository and the target repository using the received configuration parameters.

As depicted in block 308, the data transformation rules are retrieved. In one example, the test data work flow module 120 retrieves the data transformation rules.

At block 310, test cases and test scripts are generated, based on the data transformation rules. In one example, the test data work flow module 120 generates the test cases based on the data transformation rules. Thereafter, the script generation module 126 generates the test scripts for executing the test cases on the source repository and the target repository.

As illustrated in block 312, the test cases and test scripts are executed on the source repository and the target repository. In one example, the data transformation validation module 122 initiates execution of the test cases and test scripts on the source repository and the target repository.

As shown in block 314, at least one report is generated based on the execution. In one example, the data transformation validation module 122 may generate various reports, based on the execution of the test scripts and test cases, which may be used by the users, such as developers and/or database administrators, to analyze any issues that may have taken place during the data transformation process.

Computer System

Figure 4:
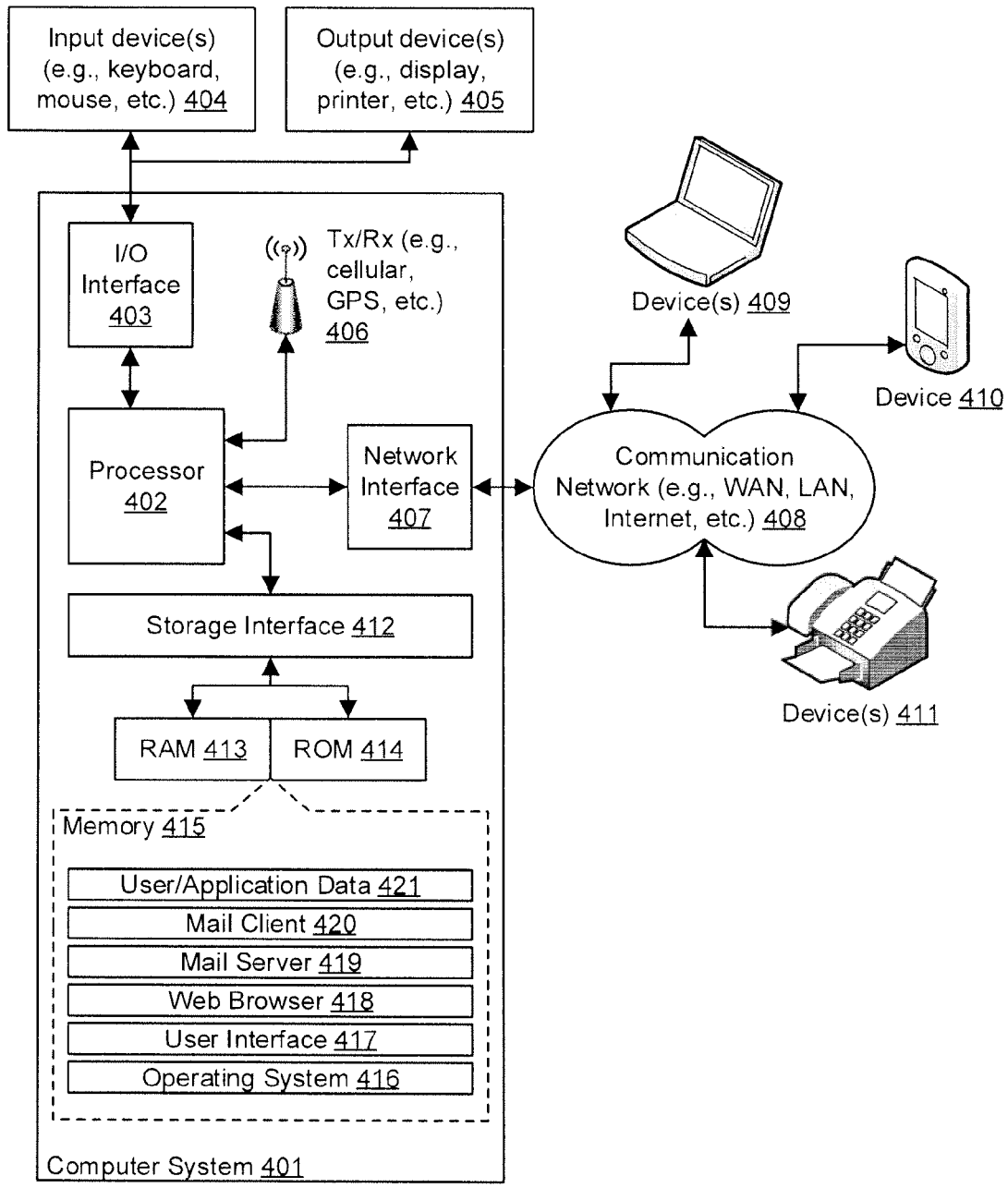
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 418-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for validating data in a communication network environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for validating data transformed from a source repository to a target repository, the method comprising:
   receiving, by a data validation computing device, a data transformation specification from a user;
   analyzing, by the data validation computing device, the data transformation specification to determine data transformation rules, wherein the data transformation rules are indicative of a relationship between corresponding fields of the source repository and the target repository;
   generating, by the data validation computing device, test cases and test scripts based on the data transformation rules;
   determining, by the data validation computing device, a number of records on which the test cases and the test scripts are to be executed;
   executing, by the data validation computing device, the test cases and the test scripts in an order based on the data transformation rules, on the source repository and the target repository to validate the relationship between the corresponding fields of the source repository and the target repository, wherein execution of the test cases and the test scripts is initiated serially when the determined number of records is less than a critical threshold, and wherein the execution of the test cases and the test scripts is initiated in parallel when the determined number of records is more than a critical threshold; and
   generating, by the data validation computing device, a log file indicative of the outcome of the execution of the test cases and the test scripts.

2. The method as set forth in claim 1, wherein the method further comprises generating, by the data validation computing device, a report, based on the log file, wherein the report is indicative of whether values stored in the corresponding fields of the source repository and the target repository are in accordance with the data transformation rules.

3. The method as set forth in claim 1, wherein the analyzing the data transformation specification further comprises:
   determining, by the data validation computing device, a schema of the source repository and the target repository;
   identifying, by the data validation computing device, attributes of the corresponding fields of the source repository and the target repository; and
   determining, by the data validation computing device, the data transformation rules based on the identified attributes.

4. The method as set forth in claim 1, wherein the execution of the test cases and the test scripts further comprises ascertaining, by the data validation computing device, at least one of inconsistent standards between corresponding fields of the source repository and the target repository, discrepancies in data format between the corresponding fields of the source repository and the target repository, difference in structure of data between the corresponding fields of the source repository and the target repository, missing values between the corresponding fields of the source repository and the target repository, data fields filled with default values or nulls in the corresponding fields of the source repository and the target repository, or data anomalies.

5. The method as set forth in claim 1, wherein the method further comprises:
   receiving, by the data validation computing device, an identifier from a user, wherein the identifier is indicative of an application whose associated data repositories are to be validated;
   identifying, by the data validation computing device, the source repository and the target repository based on the identifier;
   receiving from the user, by the data validation computing device, configuration parameters of the source repository and the target repository, wherein the configuration parameters are indicative of at least one of data formats, structure, and schema of the source repository and the target repository;
   receiving from the user, by the data validation computing device, connection parameters of the source repository and the target repository, wherein the connection parameters are indicative of the authentication details associated with accessing source repository and the target repository;

establishing, by the data validation computing device, connection with the source repository and the target repository, based on the connection parameters;
identifying, by the data validation computing device, the corresponding tables and fields of the source repository and the target repository; and
prompting, by the data validation computing device, the user to confirm the identified corresponding tables and fields of the source repository and the target repository.

6. A non-transitory computer readable medium having stored thereon instructions for validating data transformed from a source repository to a target repository comprising machine executable code that when executed by a processor, causes the processor to perform steps comprising:
receiving a data transformation specification from a user;
analyzing the data transformation specification to determine data transformation rules, wherein the data transformation rules are indicative of a relationship between corresponding fields of the source repository and the target repository;
generating test cases and test scripts based on the data transformation rules;
determining a number of records on which the test cases and the test scripts are to be executed;
executing the test cases and the test scripts in an order based on the data transformation rules, on the source repository and the target repository to validate the relationship between the corresponding fields of the source repository and the target repository, wherein execution of the test cases and the test scripts is initiated serially when the determined number of records is less than a critical threshold, and wherein the execution of the test cases and the test scripts is initiated in parallel when the determined number of records is more than a critical threshold; and
generating a log file indicative of the outcome of the execution of the test cases and the test scripts.

7. The medium as set forth in claim 6 further having stored thereon at least one additional instruction that when executed by the processor causes the processor to perform at least one additional step comprising generating a report, based on the log file, wherein the report is indicative of whether values stored in the corresponding fields of the source repository and the target repository are in accordance with the data transformation rules.

8. The medium as set forth in claim 6 further having stored thereon at least one additional instruction that when executed by the processor causes the processor to perform at least one additional step comprising:
determining a schema of the source repository and the target repository;
identifying attributes of the corresponding fields of the source repository and the target repository; and
determining the data transformation rules based on the identified attributes.

9. The medium as set forth in claim 6 further having stored thereon at least one additional instruction that when executed by the processor causes the processor to perform at least one additional step comprising ascertaining at least one of inconsistent standards between corresponding fields of the source repository and the target repository, discrepancies in data format between the corresponding fields of the source repository and the target repository, difference in structure of data between the corresponding fields of the source repository and the target repository, missing values between the corresponding fields of the source repository and the target repository, data fields filled with default values or nulls in the corresponding fields of the source repository and the target repository, or data anomalies.

10. The medium as set forth in claim 6 further having stored thereon at least one additional instruction that when executed by the processor causes the processor to perform at least one additional step comprising:
receiving an identifier from a user, wherein the identifier is indicative of an application whose associated data repositories are to be validated;
identifying the source repository and the target repository based on the identifier;
receiving from the user configuration parameters of the source repository and the target repository, wherein the configuration parameters are indicative of at least one of data formats, structure, and schema of the source repository and the target repository;
receiving from the user connection parameters of the source repository and the target repository, wherein the connection parameters are indicative of the authentication details associated with accessing source repository and the target repository;
establishing connection with the source repository and the target repository, based on the connection parameters;
identifying the corresponding tables and fields of the source repository and the target repository; and
prompting the user to confirm the identified corresponding tables and fields of the source repository and the target repository.

11. A data validation computing device, comprising a processor and a memory coupled to the processor which is configured to execute one or more programmed instructions comprising and stored in the memory to:
receive a data transformation specification from a user;
analyze the data transformation specification to determine data transformation rules, wherein the data transformation rules are indicative of a relationship between corresponding fields of a source repository and a target repository;
generate test cases and test scripts based on the data transformation rules;
determine a number of records on which the test cases and the test scripts are to be executed;
execute the test cases and the test scripts in an order based on the data transformation rules, on the source repository and the target repository to validate the relationship between the corresponding fields of the source repository and the target repository, wherein execution of the test cases and the test scripts is initiated serially when the determined number of records is less than a critical threshold, and wherein the execution of the test cases and the test scripts is initiated in parallel when the determined number of records is more than a critical threshold; and
generate a log file indicative of the outcome of the execution of the test cases and the test scripts.

12. The device as set forth in claim 11, wherein the processor coupled to the memory is further configured to execute at least one additional programmed instruction comprising and stored in the memory to generate a report, based on the log file, wherein the report is indicative of whether values stored in the corresponding fields of the source repository and the target repository are in accordance with the data transformation rules.

13. The device as set forth in claim 11, wherein the processor coupled to the memory is further configured to execute at least one additional programmed instruction comprising and stored in the memory to:

determine a schema of the source repository and the target repository;

identify attributes of the corresponding fields of the source repository and the target repository; and determine the data transformation rules based on the identified attributes.

14. The device as set forth in claim 11, wherein the processor coupled to the memory is further configured to execute at least one additional programmed instruction comprising and stored in the memory to ascertain at least one of inconsistent standards between corresponding fields of the source repository and the target repository, discrepancies in data format between the corresponding fields of the source repository and the target repository, difference in structure of data between the corresponding fields of the source repository and the target repository, missing values between the corresponding fields of the source repository and the target repository, data fields filled with default values or nulls in the corresponding fields of the source repository and the target repository, or data anomalies.

15. The device as set forth in claim 11, wherein the processor coupled to the memory is further configured to execute at least one additional programmed instruction comprising and stored in the memory to:

receive an identifier from a user, wherein the identifier is indicative of an application whose associated data repositories are to be validated;

identify the source repository and the target repository based on the identifier;

receive from the user configuration parameters of the source repository and the target repository, wherein the configuration parameters are indicative of at least one of data formats, structure, and schema of the source repository and the target repository;

receive from the user connection parameters of the source repository and the target repository, wherein the connection parameters are indicative of the authentication details associated with accessing source repository and the target repository;

establish connection with the source repository and the target repository, based on the connection parameters;

identify the corresponding tables and fields of the source repository and the target repository; and prompt the user to confirm the identified corresponding tables and fields of the source repository and the target repository.

\* \* \* \* \*